United States Patent
Hovi et al.

(10) Patent No.: US 6,803,144 B2
(45) Date of Patent: Oct. 12, 2004

(54) BATTERY PACK FOR ELECTRONIC DEVICE

(75) Inventors: Jussi Hovi, Salo (FI); Mika Kanninen, Piikkio (FI); Jari Astala, Tampere (FI); Nina Nummentalo, Salo (FI)

(73) Assignee: Nokia Corporation, Espoo (FI)

(*) Notice: Subject to any disclaimer, the term of this patent is extended or adjusted under 35 U.S.C. 154(b) by 184 days.

(21) Appl. No.: 10/033,534

(22) Filed: Nov. 1, 2001

(65) Prior Publication Data

US 2003/0082441 A1 May 1, 2003

(51) Int. Cl.[7] .................. H01M 14/100; H01M 2/10; H01M 16/38
(52) U.S. Cl. .................... 429/123; 429/7; 429/97; 429/99; 429/100; 264/272.21
(58) Field of Search .................... 429/123, 96, 97, 429/99, 100, 7; 264/272.21

(56) References Cited

U.S. PATENT DOCUMENTS

| | | | | |
|---|---|---|---|---|
| 5,622,789 A | * | 4/1997 | Young | 429/7 |
| 5,736,271 A | * | 4/1998 | Cisar et al. | 429/96 |
| D423,449 S | | 4/2000 | Naskali | D13/103 |
| 6,063,521 A | | 5/2000 | Deslyper et al. | 429/163 |
| 6,492,058 B1 | * | 12/2002 | Watanabe et al. | 429/121 |
| 6,605,922 B2 | * | 8/2003 | Tamai et al. | 320/106 |
| 2002/0009584 A1 | * | 1/2002 | Boyer | 428/315.5 |

FOREIGN PATENT DOCUMENTS

| | | |
|---|---|---|
| EP | 1032108 | 8/2000 |
| WO | WO 99/34458 | 7/1999 |

* cited by examiner

Primary Examiner—Patrick Ryan
Assistant Examiner—Thomas H Parsons
(74) Attorney, Agent, or Firm—Ware, Fressola, Van Der Sluys & Adolphson LLP

(57) ABSTRACT

A battery pack for use with a cellular telephone device includes a flat battery cell assembly encased by a resin using low temperature molding techniques or injection molding techniques under low pressure. An interface assembly cap provides an electrical connection means between the cell assembly and the cellular telephone device with which it is used. The resin molded cell assembly accommodates a smaller physical size than preformed plastic battery packs without sacrificing relative available power density.

27 Claims, 5 Drawing Sheets

BATTERY PACK FOR ELECTRONIC DEVICE

TECHNICAL FIELD

The present invention relates in general to battery housing structures, and deals more particularly with battery packs used by portable electronic devices. Specifically, the invention deals with a battery pack for packaging within a cellular telephone device.

BACKGROUND OF THE INVENTION

The growth in the use of portable electronic devices such as, for example cellular telephones, personal digital assistants commonly known as PDA's, portable music players, and the like, has driven the design of such devices to become smaller and more convenient. Consumers have become accustomed to the convenience and portability of such electronic devices, particularly, cellular telephones and have demanded that those cellular telephones become even more convenient and even more portable. The constant thrust in cellular telephone design is to make them as small as possible. To accomplish this, the cellular telephone housing and the housing of the battery pack powering the cellular telephone have been designed to meet stringent size restrictions and to be as light as possible. Typical battery housings for cellular telephones incorporate a plastic case or enclosure for holding the battery cells and often other electrical circuitry components necessary to build-up the complete battery structure to power the phone when the battery housing is engaged with the cellular telephone.

A battery housing or enclosure such as described above is typically preformed and expands all dimensions of width, length and height of the battery package compared to the battery cell contained within and carried by the housing. The size of the battery package is further enlarged to accommodate other component parts such as mechanical engaging means to attach the battery package into the cellular telephone, electronic circuitry for charging control and battery cell protection, interface contact area to make electrical contact from the battery package to the cellular telephone. One example of such a complete prior art preformed battery package in a case is shown, for example, in U.S. Design Patent Des. 423,449 assigned to the same assignee as the present invention.

In an attempt to minimize the size and weight of battery housings for portable electronic devices, particularly cellular telephones, lightweight plastic materials that have electrical insulative properties have been used to fabricate battery housings with relatively thin walls. The resultant battery housing often exhibits low structural integrity and tends to be relatively easy to break and fracture upon dropping and is generally unsatisfactory for use in cellular telephones and portable electronic devices. Additionally, the smaller sized battery package often results in a reduction of the relative electrical power density capacity available as the battery cells are likewise reduced in physical size to fit into the smaller sized battery pack. Therefore, a need exists for a battery package to power cellular telephones and portable electronic equipment that exhibits the electrical insulative properties of a plastic battery housing while providing a solution to achieve even smaller size battery packs without sacrificing the available relative electrical power density capacity of the battery pack.

SUMMARY OF THE INVENTION

Accordingly, it is an object of the present invention to provide a battery pack for use with portable electronic devices, particularly, cellular telephones.

It is another object of the invention to provide a battery package structure that is suitable for a smaller physical design.

It is yet another object of the invention to maximize the available relative electrical power density capacity in such a battery package.

It is another object of the present invention to provide a battery package without a preformed enclosure for a cellular telephone.

It is yet a further object of the present invention to provide a battery package that is encased by a low temperature melting resin.

It is a still further object of the invention to provide a battery package that is encased with a resin capable of being injection molded with relatively low pressure.

It is a still further object of the present invention to provide a battery package that is easy to manufacture.

In accordance with one aspect of the present invention, a battery pack is provided for an electronic device. The battery pack includes at least one battery cell assembly. An interface assembly cap has a size and shape for complementary engagement with one end portion of the battery cell assembly. The interface assembly cap provides an electrical connection means between the cell and the electronic device. The interface assembly further provides an electrical connection to the cell whether the battery pack is positioned within or outside the electronic device. A low-temperature melting resin encases the battery cell assembly.

Preferably, the battery pack includes an end cap having a size and shape for complementary engagement with an end portion of the battery cell opposite the interface assembly end portion.

Preferably, a low-temperature melting resin further encases the end cap and the interface assembly cap.

Preferably, the interface assembly cap includes an externally accessible positive, negative and ground voltage reference potential contact.

Preferably, the voltage reference potential contacts are positionally located in accordance with the positional locations of the voltage reference potential contacts of the electronic device with which the battery pack is used.

Preferably, the battery pack includes means for aligning the battery pack when positioned within the electronic device.

Preferably, the cell further comprises a flat cell.

Preferably, the battery pack is for use in a cellular telephone.

Preferably, the cell has at least one member extending lengthwise of the cell for increasing the stiffness and lengthwise rigidity of the battery cell assembly.

In another aspect of the battery pack of the present invention, a thin foil tape is wrapped around the battery cell assembly.

In a second aspect of the invention, a method for molding a battery pack for an electronic device is presented. The method comprises the steps of providing at least one battery cell assembly having a desired shape and size and a positive voltage potential terminal and a negative voltage potential terminal; providing an electrical connection means for interfacing between the battery cell assembly and the electronic device; electrically connecting the electrical connection means to the battery cell assembly wherein the positive voltage potential terminal is connected to the positive voltage supply path of the electrical connection means and the negative voltage potential terminal is connected to the negative voltage supply path of the electrical connection means; placing the electrical connection means and the battery cell assembly into a mold; positioning and maintaining the electrical connection means adjacent to and in contact with one end of the battery cell assembly; closing the mold; pouring a low temperature melting resin into the mold to encase the electrical connection means and battery cell assembly; and removing the thus molded battery pack from the mold.

Preferably, the method step of providing an electrical connection means includes providing a printed circuit board.

Preferably, the method step of providing an electrical connection means includes providing a gold plated nickel conductor.

Preferably, the step of placing the electrical connection means into a mold includes the step of placing the electrical connection means into a metal mold.

Preferably, the method step of pouring includes pouring a polyamide.

Preferably, the method step of pouring includes pouring a polyurethane.

Preferably, the method includes the step of molding under low pressure.

Preferably, the method includes the step of providing a flat battery cell assembly.

In a third aspect of the invention, a battery pack for a cellular telephone is presented. The battery pack includes at least one battery cell assembly having a desired shape and size and a positive voltage potential terminal and a negative voltage potential terminal.

An electrical conductive path is provided to interface the battery cell assembly and the cellular telephone, wherein the electrical conductive path has a positive voltage potential contact electrically connected to the battery cell assembly positive voltage potential terminal and a negative voltage potential contact electrically connected to the battery cell assembly negative voltage potential terminal. The positive and negative voltage potential contacts are located and positioned for contact with the positive and negative voltage potential terminals of a cellular telephone with which the battery pack is used.

Preferably, a low temperature melting resin encases the battery cell assembly and the electrical conductive path to form a relatively thin wall molded battery pack.

Preferably, the low temperature melting resin is polyamide.

Preferably, the low temperature melting resin is polyurethane.

Preferably, the electrical conductive path interfaces with charging control circuitry in the cellular phone.

Preferably, the electrical conductive path interfaces between the battery cell and battery cell monitoring and status indication circuitry in the cellular phone.

Preferably, the electrical conductive path is a printed circuit board.

Preferably, the interfacing printed circuit board further includes charging control circuitry.

Preferably, the interfacing printed circuit board further includes battery cell voltage and current monitoring and status indication circuitry.

BRIEF DESCRIPTION OF THE DRAWINGS

Other features, objects and advantages of the battery pack of the present invention will become readily apparent from the following written description of several exemplary embodiments taken in conjunction with the drawings wherein.

DETAILED DESCRIPTION OF PREFERRED EMBODIMENTS

Figure 1:
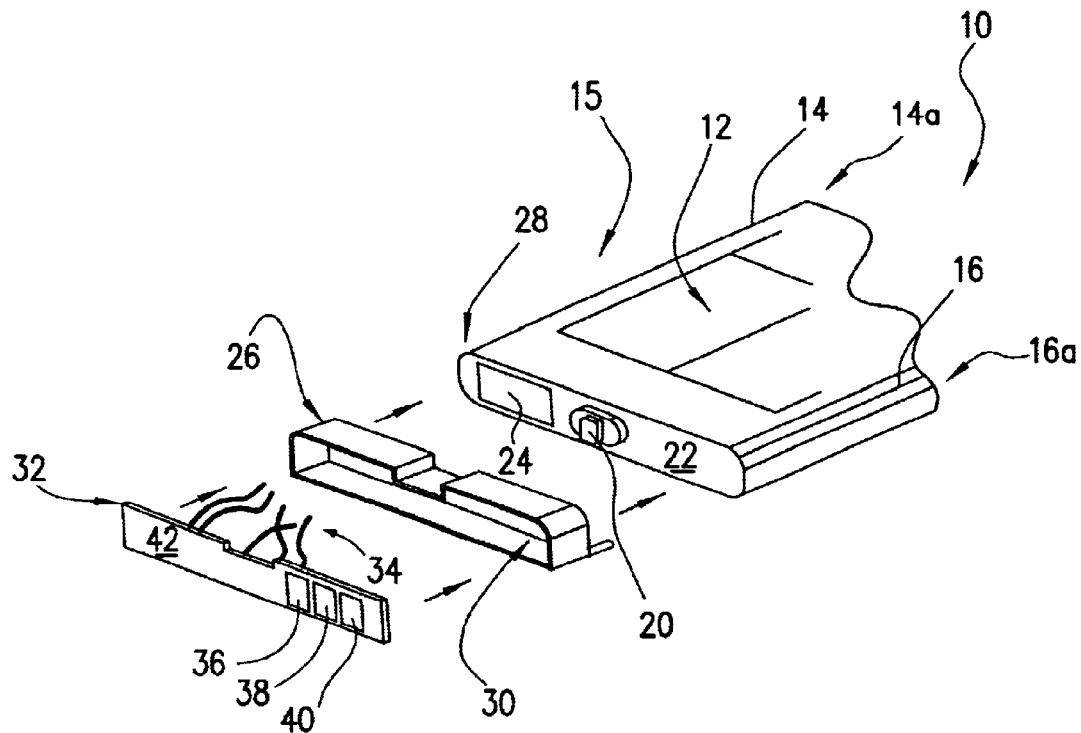
FIG. 1 is a schematic perspective exploded view of the power connection portion of a battery pack embodying the present invention.

Turning now to the drawings and considering the battery pack of the present invention in further detail, FIG. 1 is an exploded schematic perspective view of a battery pack embodying the present invention and is generally designated 10. The battery pack 10 comprises at least one cell assembly, generally designated 12. In one embodiment, the cell assembly 12 is held between ribbed members 14, 16 extending lengthwise of the cell assembly 12 at opposite lateral edge portions 14a, 16a, respectively. The cell assembly 12 has a positive electrode terminal (not shown) which terminates at a positive voltage reference potential contact 20 located on the face portion 22 of the cell assembly 12. The cell assembly 12 has a negative electrode terminal (not shown) which terminates at a negative voltage reference potential contact 24 also located on the face portion 22 of the cell assembly 12. In one embodiment of the invention, a holder, generally designated 26, is provided and which holder has a size and shape for a complementary engagement with the end portion 28 of a ribbed cell assembly generally designated 15, which assembly 15 is defined by the cell assembly 12 and ribs 14, 16. It will be understood that the cell assembly 12 does not require the ribs 14, 16 to provide the intended function. The holder 26 has an outwardly facing cavity or void, generally designated 30, into which electronic components and connecting wiring associated with the electronic device or cellular telephone for interfacing with the battery may be nested. The wiring 34 electrically couples the respective positive voltage reference terminal 20 and negative reference voltage terminal 24 to provide the positive and negative reference voltage potentials and the control battery monitoring and status signals at the interface contact terminals 36, 38, 40 carried on the external face 42 of an electrical connection means such as, for example, the printed circuit board 32. The printed circuit board 32 may also carry electrical circuitry components, such as, for example, integrated circuits to control the electrical charge to the cell assembly 12, and for providing electrical short circuit or over-current protection for the cell assembly 12. Additional circuitry, such as, for example, cell voltage and current monitoring circuitry, cell temperature and the like, is provided for use by the portable electronic device or cellular telephone with which the battery pack 10 is used. Such signals may be provided at the contact 40, with contacts 36, 38 providing the voltage reference potential contacts. The wiring or other connections 34 may be soldered or spot-welded to the contacts 20,24 or by other means now well known or future-developed. Once the circuit board 32 is assembled physically in place with the holder 26, the circuit board 32 can be ultrasonically welded or otherwise connected to the holder 26. With the circuit board 32 in place within the face opening of the cavity 30 of the holder 26, to effectively seal the cavity, the holder 26 is in turn held by the end 28 of the ribbed cell assembly 15. The entire assembly, with or without ribs, is now ready for molding using low temperature molding or low-pressure injection molding techniques as described herein below.

Figure 3:
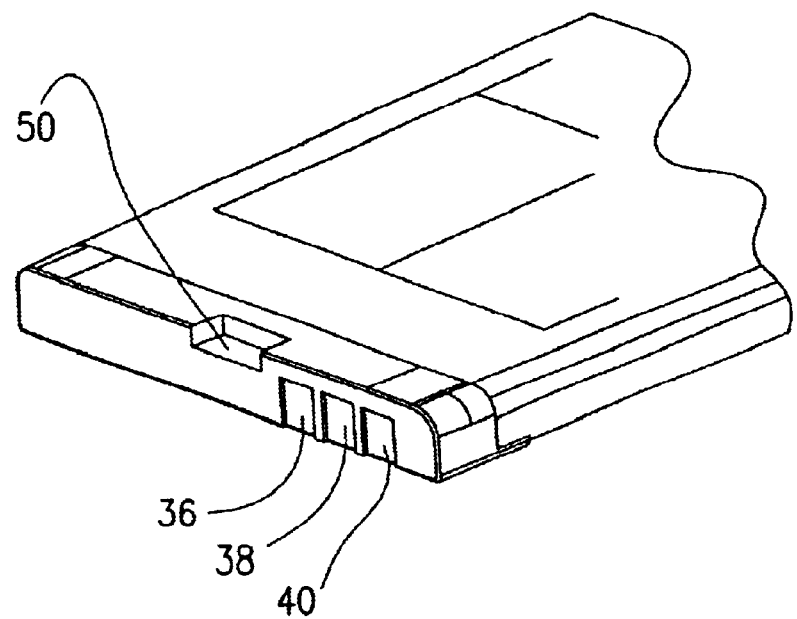
FIG. 3 is a schematic perspective view showing a complete battery pack embodying the present invention.

The battery pack components thus assembled are now set in a mold, and a low temperature melting resin is used to encase the battery assembly, as illustrated in FIG. 3.

Alternately, the battery assembly can be encased using low-pressure injection molding techniques. In FIG. 3, the battery pack thus assembled shows the holder 26 with an alignment notch, generally designated 50, for use in engaging the battery pack with the portable electronic device or cellular telephone with which it is used. Likewise, the contacts 36, 38, 40 are not molded over or covered by the resin and are left exposed for electrical connection to the cellular telephone or electronic device with which the battery pack is used. The resin covers the battery pack with a thickness sufficient to provide the necessary structural form for handling the battery pack but, unlike preformed plastic cases as discussed above, the wall thickness is relatively thin to minimize weight and size and to accommodate a larger cell assembly in the same physical volume in the cellular telephone.

In another embodiment, only the edges of the cell assembly 12 are molded, and the major face surfaces of the cell assembly are not covered.

Figure 2:
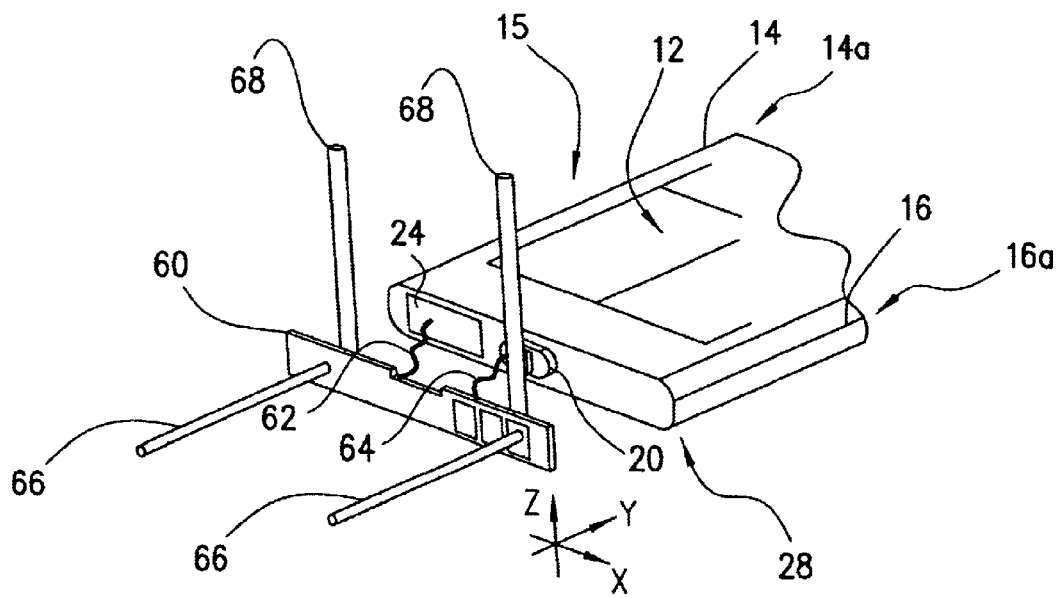
FIG. 2 is a schematic perspective view showing the end cap aligned and held in position adjacent the power connection end of the battery pack for low temperature molding therewith.

Turning now to FIG. 2, an alternate method for assembling the battery pack is illustrated therein, wherein the like reference numerals in FIGS. 1 and 3 designate like parts in FIG. 2. In FIG. 2, the ribbed cell assembly, generally designated 15, defined by the cell assembly 12 and ribs 14, 16, is positioned in a mold, such as a metal mold (not shown). An electrical connection means such as a printed circuit board, generally designated 60, is functionally similar to the printed circuit board 32 illustrated in FIG. 1. The printed circuit board 60 may also carry integrated circuit components and other electrical circuitry components and wiring for connection to the voltage reference terminals 20, 24, respectively, via wires or metal strips or other means 62, 64 well known to those skilled in the art of battery terminal connection. The ribbed cell assembly 15 is positioned in the mold and the printed circuit board 60 is positioned likewise in the mold adjacent to the end 28 of the cell assembly by means of support and alignment pins 66, 68. Once the printed circuit board 60 is properly positioned and aligned with the ribbed cell assembly 15, the mold is closed and a resin is poured into the mold. In the molding process, at least the circuit board 60 and the end 28 are molded by the resin to seal and hold the battery pack together. Alternately, the holder 26 may also be molded to the end 28 along with the printed circuit board 60 to provide a complete battery pack. The support and alignment pins 66, 68 are used in this embodiment to precisely locate and maintain the circuit board 60 with respect to the end 28 by adjustment in the x-, y- and z-axes directions in the mold.

The mold, not shown, is well known to those skilled in the molding art and includes bosses which prevent the resin from filling in around the contact portions 36, 38, 40, and further provide the notch area 50.

It is preferable that a polyamide or polyurethane or other materials providing the desired characteristics as known to those skilled in the art be used as the resin material. Preferably, the molding of the printed circuit board 60 and cell assembly 14 is done at a low temperature and a low pressure. When a polyamide or polyurethane is used as the resin to mold the battery pack, the molding operation can be carried out at a low temperature and under a low pressure when compared with a generally used resin because the melting points of the polyamide and polyurethane are low, along with the viscosity. The molding under low temperature and low pressure eliminates the potential of exposing the printed circuit board and its components to high temperatures and pressure that are associated with and generally present with conventional plastic injection molding processes. The method for manufacturing the battery pack using low temperature melting resins and under low pressure is simplified, and the molding time is minimized relative to plastic injection molding techniques. One suitable resin molding technique is known as "Hot Melt," available from TRL in France.

The cell assembly 12 is preferably a lithium ion cell. The battery pack of the present invention also contemplates use of sealed lead cells, NiMh (nickel metal hydride) and NiCd (nickel cadmium) and other battery types now known or future-developed. Preferably, the batteries have a "flat" profile and construction and such batteries are also commonly known and referred to as "flat cells" or "prismatic cells." In a further embodiment, the cell assembly may be wound with a foil tape to insulate and protect the cell assembly 12 and provide a complete battery pack. In this instance, the holder 26 is also taped to hold the printed circuit board and holder to the cell assembly.

Figure 4:
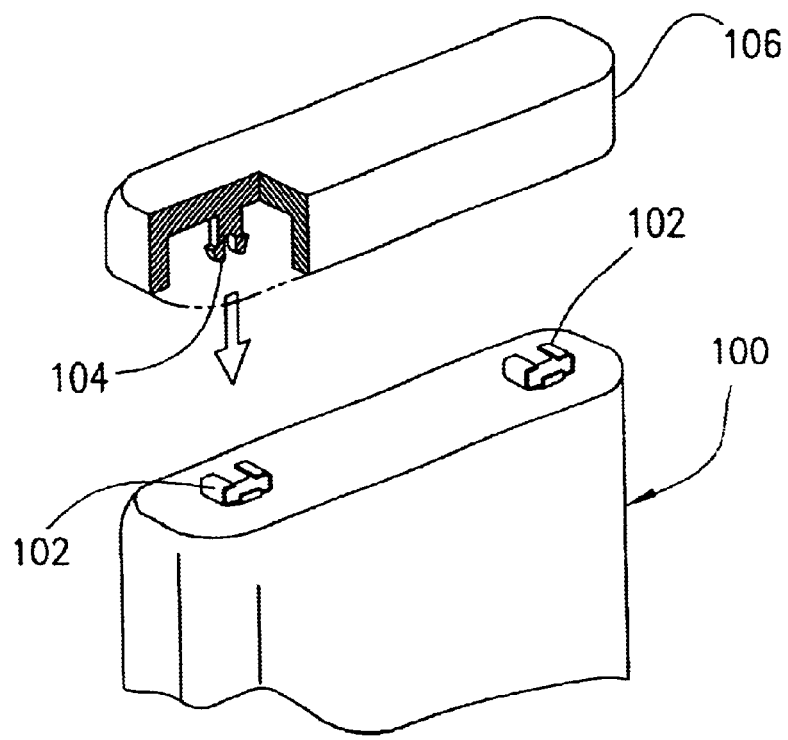
FIG. 4 is a schematic drawing showing a snap fitting between the battery cell assembly and the end cap battery cell holder.

Turning now to FIG. 4, an alternate method of attaching the holder to the cell is illustrated therein, wherein the cell is generally designated 100, and includes an engageable snap means 102 for receiving and engaging with a grip 104 carried by the holder 106. The holder 106 is sized and shaped to form a coextensive end portion of the cell 100 when engaged with the cell 100. The holder 106 is similar to the holder 26 and forms the interface electrical connection path between the positive and negative voltage reference terminals of the cell 100 and the battery connections of the electronic device or cellular telephone with which it is used. The holder 106 may additionally be glued or held with double-sided tape rather than just the mechanical snap connection.

Figure 5:
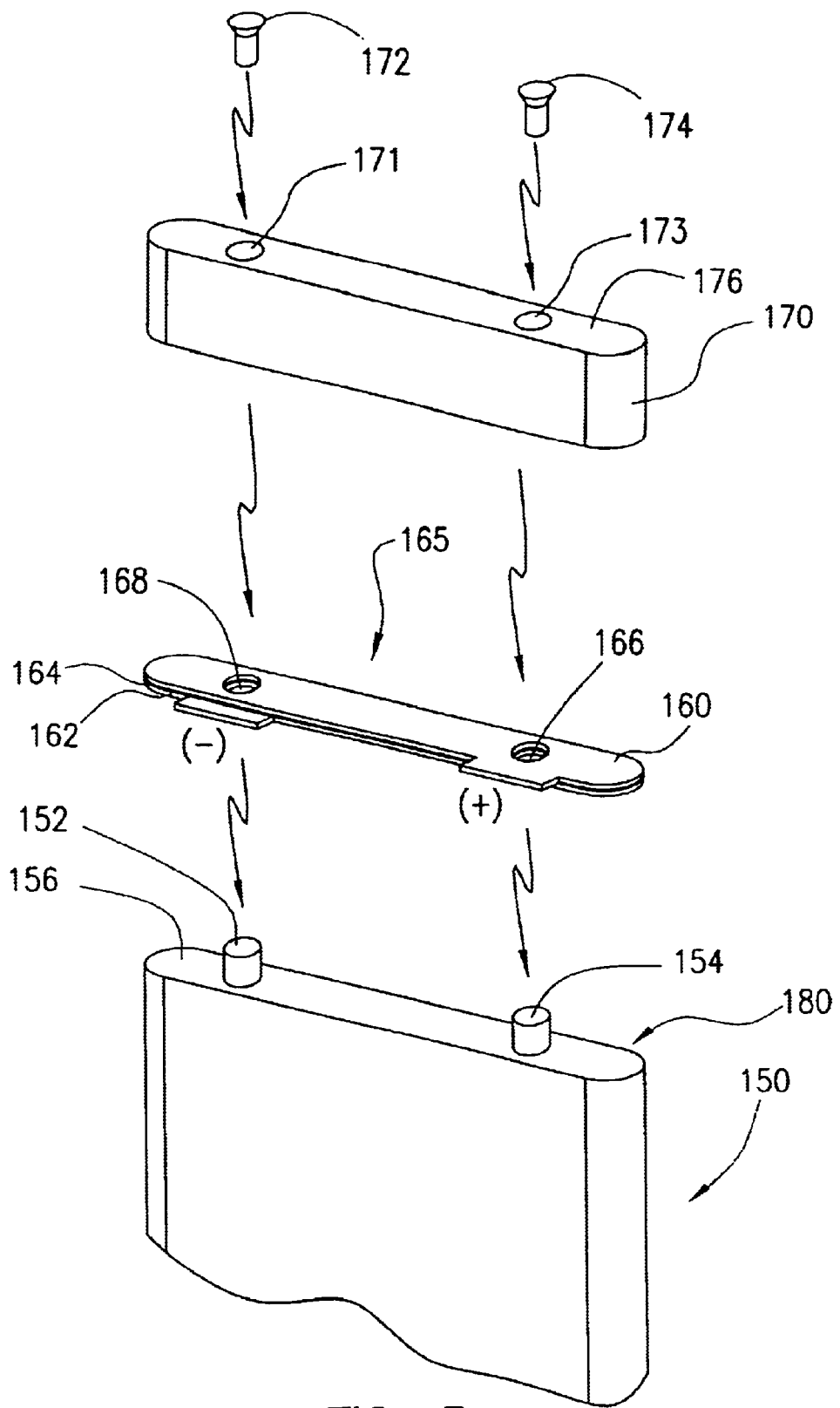
FIG. 5 is a schematic drawing showing a screw fitting between the battery cell assembly and the end cap battery cell holder.

Turning now to FIG. 5, a further alternate embodiment of the battery pack of the present invention is illustrated therein. The cell, generally designated 150, includes positive and negative voltage potential terminals 152, 154 extending outwardly from one face end 156. A connection assembly 165 comprising conductive metal sheets 160, 162 separated by an insulator 164 forms a laminate which has holes or openings 166, 168 therein, through which the terminals 152, 154 extend therethrough. A holder, generally designated 170, is sized and shaped to be coextensive with the cell 150 and arranged to fit over the end 180 of the cell. The holder 170 includes two holes 171, 173 in alignment with the terminals 152, 154 which are threaded to receive screws 172, 174 to attach the holder 170 to the cell 150. The positive and negative reference voltage potentials are accessible through the face 176 of the holder 170 and in alignment with the positive and negative plates 160, 162 respectively of the laminate making contact with the positive and negative voltage potential of the battery cell. The screws 172, 174 are nonmetallic, as is the holder 170, and therefore nonconductive. Alternatively, the screws 172, 174 may be metallic if a thin insulating tape or plastic foil or other such electrically insulating means is used to separate the screws and printed wired board.

Figure 6:
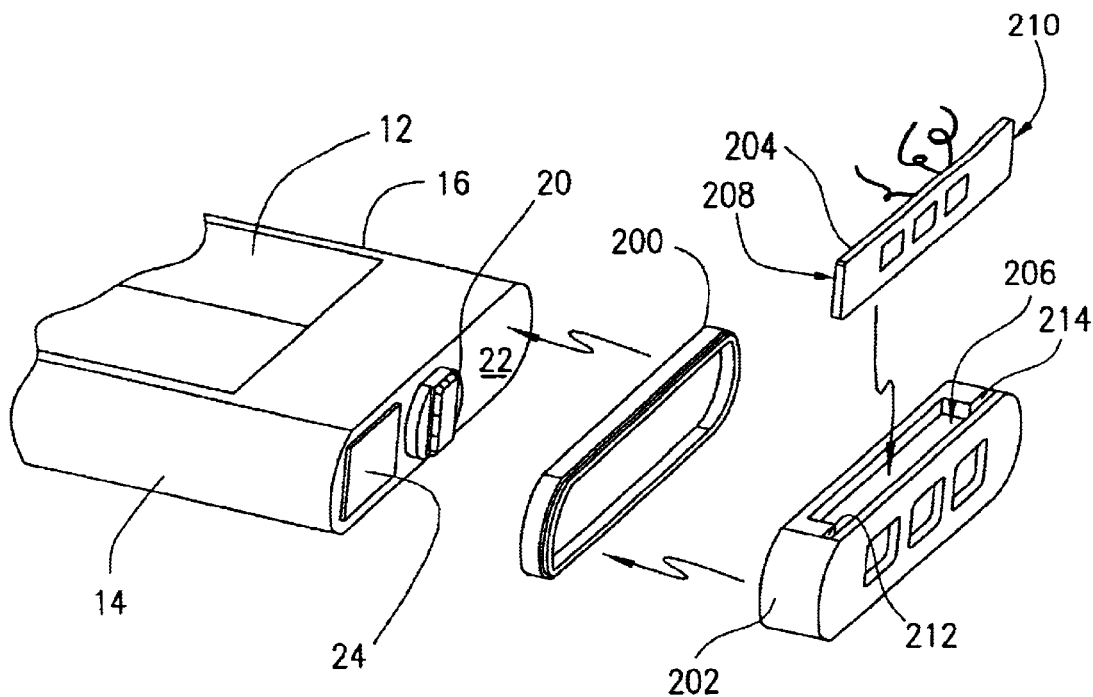
FIG. 6 is a schematic perspective exploded view of the power connection end of an alternate embodiment of the battery pack of the present invention.

Turning now to FIG. 6, an alternate embodiment of the battery pack of the present invention is illustrated therein. The cell assembly is similar to that shown in FIG. 1 and comprises a flat cell assembly 12, ribs 14, 16, a negative reference voltage potential contact 24 and a positive voltage reference potential contact 20. An aluminum ring insert having a shape generally conforming to the end face 22 of the cell assembly is generally designated 200 and is held to and engages with the holder 202. The holder 202 receives a printed circuit board 204, which carries electronic integrated circuits and other electronic circuitry components together with electrical wiring to interface the cell assembly with the portable electronic device or cellular telephone with which the battery pack is used. The printed circuit board 204 is received through the upper opening, generally designated 206, in the holder 202 and engages the lateral edges 208, 210 of the printed circuit board 204 in slots 212, 214, respectively. Once the holder 202 is assembled with the aluminum ring 200, the completed assembly is then attached to the cell assembly by laser welding, ultrasonic welding or other technique well, known to those skilled in the art to attach the aluminum ring 200 to the cell assembly. The interior of the holder 202 may be sealed by filling it with a nonconductive material.

Figure 7:
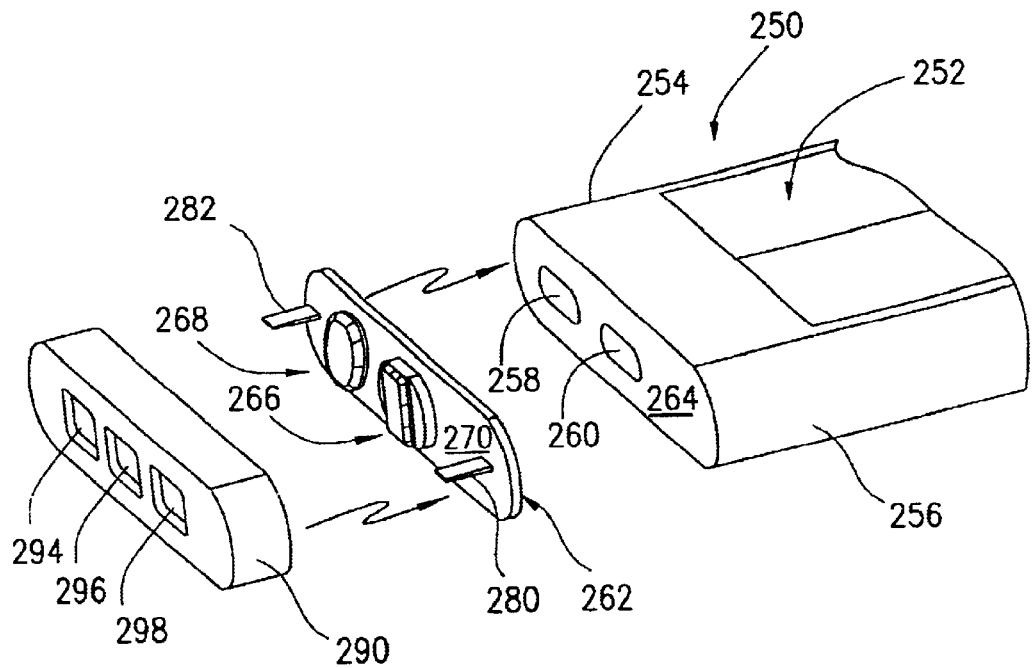
FIG. 7 is an exploded schematic view of an alternate embodiment of the battery pack of the present invention.
Figure 8:
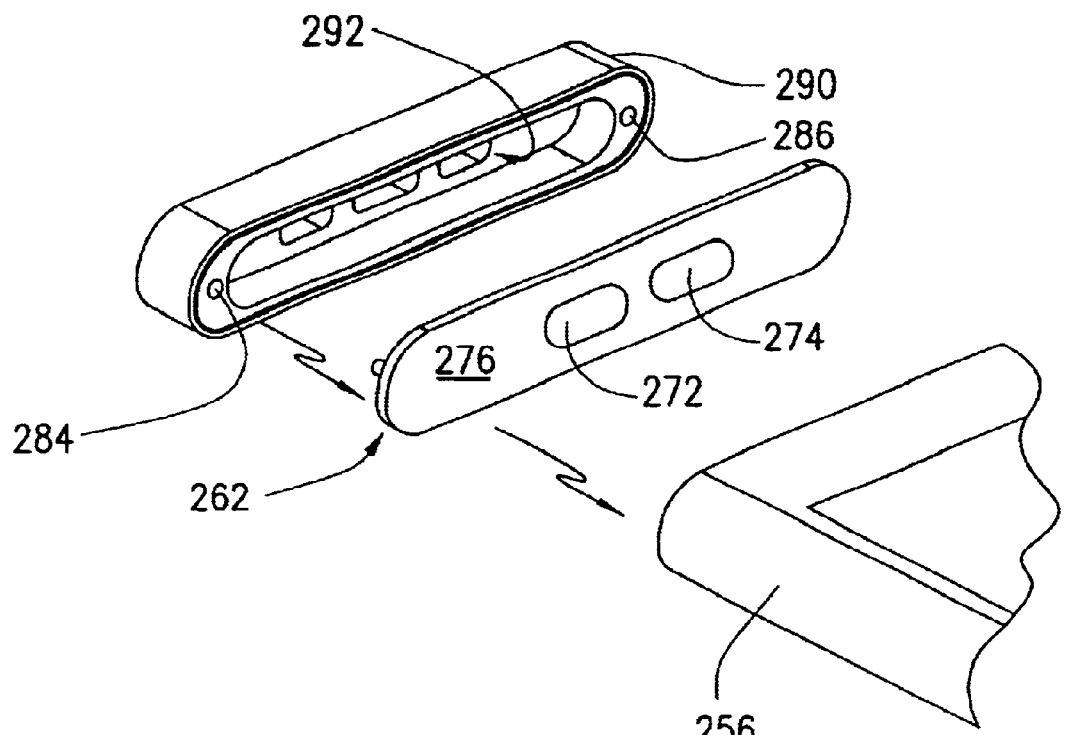
FIG. 8 is an exploded alternate view of the battery pack shown in FIG. 7.
Figure 9:
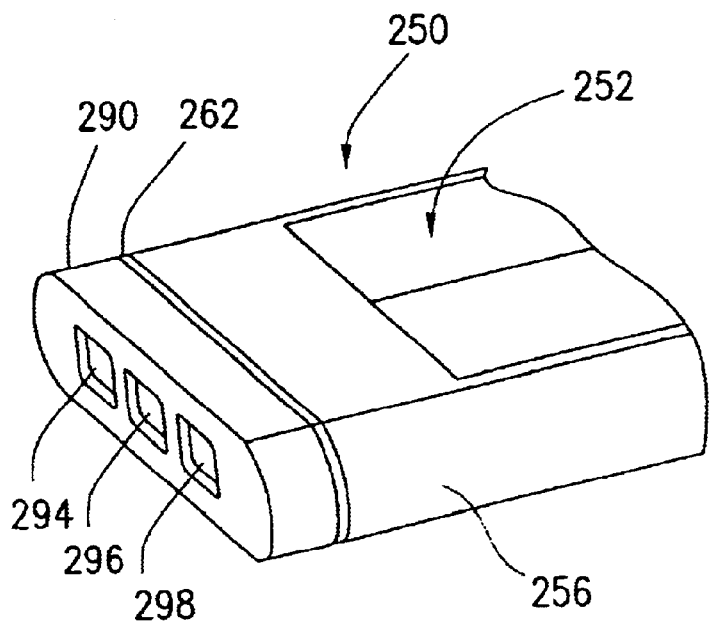
FIG. 9 is a schematic perspective view of the assembled battery pack shown in FIGS. 7 and 8.

Turning now to FIGS. 7, 8 and 9, an alternate embodiment of the battery pack embodying the present invention is illustrated therein. The cell assembly, generally designated 250, is similar to the cell assembly described in connection with FIG. 1 and includes at least one flat cell 252 and may alternately include rib members 254, 256 extending lengthwise of the cell, and the cell and rib members define the cell assembly 250. The positive voltage reference and negative voltage reference potentials appear at the contacts 258, 260, respectively, and which contacts are connected internally to the cell 252 via electrical conductors or electrical paths. A printed circuit board, generally designated 262, is sized and shaped to be coextensive with the cell assembly and in contact with the face 264 of the cell assembly 250. The printed circuit board 262 includes terminals or contacts 266, 268 on the side 270 of the printed circuit board 262. The contacts 266, 268, extend through the printed circuit board 262 to provide a contact surface 272, 274, respectively, on the face surface 276 disposed opposite the face 270. The contacts 272, 274 are positioned on the printed circuit board 262 to electrically connect to the positive and negative voltage reference terminals 258, 260 of the cell assembly 250. The printed circuit board 262 may additionally carry integrated circuits and other electronic circuitry components in a similar manner to that disclosed above.

The printed circuit board 262 additionally includes locating or positioning tangs or stakes 280, 282 projecting outwardly of the face 270 in the direction away from the cell assembly when the printed circuit board 262 is in position adjacent to the cell assembly. The stakes 280, 282 are received in mating apertures or counter sunk holes 284, 286 respectively of the holder 290. The stakes 280, 282 serve as alignment means and also as means for connecting the printed circuit board 262 to the holder 290. The stakes 280, 282 may be made of the same material as the holder 290 and the holder and stakes may be constructed as an integral unit, such as by molding. Alternately, the stakes can be press-fitted through the holder or provided in any way known to those skilled in the art to achieve the intended function. The holder and stakes may be of a polyamide or similar polymer compound or may be of a hard plastic such as polycarbonate. The holder 290 is likewise sized and shaped to be coextensive with the cell assembly. The holder 290 includes a cavity 292 for accommodating integrated circuits and other electrical circuitry components mounted on the printed circuit board 262 when the circuit board is in position adjacent to the holder 290. The printed circuit board 262 further seals the cavity 292 when the battery pack is assembled with the holder 290. The holder 290 and printed circuit board 262 may be attached to one another by gluing or ultrasonic welding of the stakes within the receiving apertures 284, 286 or by gluing or ultrasonic welding of the mating surfaces between the printed circuit board and holder.

The holder 290 includes, as described above, outwardly facing openings 294, 296, 298 to provide access to the positive and negative voltage reference potentials and, as described above, optional battery indication or status signals. The openings 294, 296, 298 are aligned and positioned to mate with the portable electronic device or cellular telephone with which the battery pack is used. The completed battery pack is illustrated in FIG. 9. The holder 290, printed circuit board 262 and cell assembly can alternately be wrapped with a thin adhesive foil to complete the structure. The thin adhesive foil may be non-conductive such as mylar, polyethylene (PET) or other plastic foil, or may be paper, or may be metallic such as aluminum foil. Additionally, the holder 290, printed circuit board 262 and cell assembly can be wrapped with a shrink-tube-type material to form the final assembly. Other means now known or future-developed may also be used to join the components of the battery pack and are chosen in accordance with the materials used in the various component parts.

It is also preferable that the cell assembly be electrically insulated to protect users and against short circuits. It is preferred that the wrapping foil is non-conducting. Aluminum foils are also considered non-conducting since aluminum is only a thin, vaporized layer on top of PET plastic carrier. It is particularly important to electrically insulate the bottom end of the cell assembly, i.e., the edge end opposite the connectors and holder end. Cell insulation is particularly important if the cell potential is not at ground potential; for example, many of the commercial lithium ion cells have positive cell can voltage potential on them.

If the cell potential differs from GND (ground) potential, it is preferable that the electrical insulation be made with foil and the bottom end be insulated with, for example, foil, adhesive tape or the same hot melt material (low temperature/low pressure molding material) used to form the connector cap. If the cell can is at GND potential, the bottom insulation and foil are not necessarily needed, and the foil may be conductive.

The present invention has been described above with reference to several preferred embodiments. Those of ordinary skill will appreciate that the invention is not limited to the particularly described embodiments, and modifications and variations of these embodiments will be apparent to those of ordinary skill in the battery housing art. As such, the present invention is not limited to the above-described embodiments, which are presented by way of example rather than limitation.

What is claimed is:

1. A battery pack for an electronic device comprising:
   a battery cell assembly having a flat profile construction comprising a first end portion defining a face portion and a second end portion opposite said first end portion and defining a bottom end portion, a positive voltage reference potential contact and a negative voltage reference potential contact located on said face portion, a first major face surface and a second major face surface disposed opposite said first major face and located between said face portion and said bottom portion;
   an interface assembly cap comprising an electrical circuit board assembly and located between said face portion and said bottom portion, having a size and shape for complementary engagement with said face portion of said battery cell assembly far providing an electrical connection means between said battery cell assembly and the electronic device, said interface assembly cap further providing an electrical connection to said battery cell whether the battery pack is positioned within or outside the electronic device; and
   a resin encasing said interface assembly cap and said battery cell assembly to seal and hold the battery pack to together.

2. The battery pack as defined in claim 1, wherein said resin further comprises a low temperature melting resin.

3. The battery pack as defined in claim 2, wherein said resin further comprises a polyamide.

4. The battery pack as defined in claim 1, further comprising a thin foil wrapped around said battery cell assembly.

5. The battery pack as defined in claim 4, wherein said thin foil further comprises an adhesive foil.

6. The battery pack as defined in claim 4, wherein said thin foil further comprises a non-metallic/non-conducting adhesive foil.

7. The battery pack as defined in claim 1, wherein said interface assembly cap further comprises a holder having a size and shape for complementary engagement with said face end portion of said battery cell assembly and for holding said electrical circuit board assembly.

8. The battery pack as defined in claim 7, further comprising a low-temperature melting resin encasing said holder and said interface assembly cap.

9. The battery pack as defined in claim 8, wherein said interface assembly cap further comprises electrical connection contacts for providing external access to said respective positive and negative voltage reference potentials contacts.

10. The battery pack as defined in claim 9, wherein said voltage reference potential electrical connection contacts are positionally located in accordance with the positional locations of the voltage reference potential contacts of the electronic device with which the battery pack is used.

11. The battery pack as defined in claim 10, further comprising means for aligning the battery pack when positioned within the electronic device.

12. The battery pack as defined in claim 1 for use in a cellular telephone.

13. A method for molding a battery pack for an electronic device comprising the steps of:
   providing a battery cell assembly having a flat profile construction comprising a first end portion defining a face portion, a second end portion disposed opposite said face portion and defining a bottom end portion, a first major face surface and a second major face surface disposed opposite said first major face and located between said face end portion and said bottom end portion, and having a desired shape and size and a positive voltage reference potential contact terminal and a negative voltage reference potential contact terminal;
   providing an electrically conductive means for interfacing between the battery cell assembly and the electronic device;
   electrically connecting the electrically conductive means to the battery cell assembly wherein the positive voltage potential contact terminal is connected to the positive voltage supply path of the electrically conductive means and the negative voltage potential contact terminal is connected to the negative voltage supply path of the electrically conductive means;
   placing the electrically conductive means and the battery cell assembly into a mold;
   positioning and maintaining the electrically conductive means adjacent to and in contact with the face end portion of the battery cell assembly;
   closing the mold;
   pouring a low temperature melting resin into the mold thereby encasing the electrically conductive means and battery cell assembly in the resin to seal and hold the battery pack together; and
   removing the thus molded battery pack from the mold.

14. The method as defined in claim 13, wherein the step of pouring further comprises pouring a polyamide.

15. The method as defined in claim 13, wherein the step of pouring further comprises pouring a polyurethane.

16. The method as defined in claim 13, further comprising the step of molding under low pressure.

17. The method as defined in claim 13, wherein the step of providing an electrically conductive means further comprises providing an electrical circuit board assembly.

18. The method as defined in claim 13, wherein the step of providing an electrically conductive means further comprises providing a gold-plated nickel conductor.

19. The method as defined in claim 13, wherein the step of placing into a mold further comprises placing into a metal mold.

20. A battery pack for a cellular telephone comprising:
   a battery cell assembly having a flat profile construction comprising a first end portion defining a face portion, a second end portion disposed opposite said face portion and defining a bottom end portion, a first major face surface and a second major face surface disposed opposite said first major face and located between said face end portion and said bottom end portion, and having a desired shape and size and a positive voltage reference potential contact terminal and a negative voltage reference potential contact terminal;
   an interface assembly cap comprising an electrical circuit board assembly defining an electrical conductive path between the battery cell assembly and the cellular telephone for interfacing the battery cell assembly and the cellular telephone, wherein the electrical conductive path has a positive voltage potential contact electrically connected to the battery cell assembly positive voltage reference potential contact terminal and a negative voltage reference potential contact electrically connected to the battery cell assembly negative voltage reference potential contact terminal, said positive and negative voltage potential contacts located and positioned for contact with the positive and negative voltage reference potential contact terminals of a cellular telephone with which the battery pack is used; and a resin encasing said interface assembly cap and said battery cell assembly to form a relatively thin wall molded battery pack.

21. A battery pack as defined in claim 20, wherein said resin further comprises a low temperature melting resin.

22. The battery pack as defined in claim 21, wherein said resin comprises a polyamide.

23. The battery pack as defined in claim 21, wherein said resin comprises a polyurethane.

24. The battery pack as defined in claim 21, wherein said electrical conductive path further comprises charging control circuitry.

25. The battery pack as defined in claim 21, wherein said electrical conductive path further comprises battery cell voltage and current monitoring and status indication circuitry.

26. The battery pack as defined in claim 21, wherein said electrical conductive path further comprise interfacing connection means between the battery cell assembly and charging control circuitry in the cellular telephone.

27. The battery pack as defined in claim 21, wherein said electrical conductive path further comprises interfacing connection means between the battery cell assembly and battery cell monitoring and status indication circuitry in the cellular telephone.

* * * * *

UNITED STATES PATENT AND TRADEMARK OFFICE
CERTIFICATE OF CORRECTION

PATENT NO. : 6,803,144 B2
DATED : October 12, 2004
INVENTOR(S) : Hovi et al.

It is certified that error appears in the above-identified patent and that said Letters Patent is hereby corrected as shown below:

Column 9,
Line 20, "far" should be -- for --.

Column 11,
Line 13, "claim 21" should be -- claim 20 --.

Column 12,
Lines 1, 5 and 9, "claim 21" should be -- claim 20 --.

Signed and Sealed this

Sixth Day of September, 2005

JON W. DUDAS
*Director of the United States Patent and Trademark Office*